(12) United States Patent
Liang et al.

(10) Patent No.: US 11,428,986 B1
(45) Date of Patent: Aug. 30, 2022

(54) DIRECT-TYPE LIGHT SOURCE MODULE AND DISPLAY DEVICE

(71) Applicant: Wistron Corporation, New Taipei (TW)

(72) Inventors: Han-Jen Liang, New Taipei (TW); Lei-Ken Hung, New Taipei (TW); Ching-Hsuan Tsai, New Taipei (TW); Wei-Chi Lin, New Taipei (TW); Chih-Chou Chou, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 17/391,037

(22) Filed: Aug. 2, 2021

(30) Foreign Application Priority Data

May 17, 2021 (TW) .................................. 110117682

(51) Int. Cl.
*G02F 1/13357* (2006.01)
(52) U.S. Cl.
CPC .. *G02F 1/133608* (2013.01); *G02F 1/133603* (2013.01)
(58) Field of Classification Search
CPC ......... G02F 1/133603; G02F 1/133602; G02F 1/133608
See application file for complete search history.

(56) References Cited

U.S. PATENT DOCUMENTS

| | | | |
|---|---|---|---|
| 2016/0044776 A1* | 2/2016 | Park | G02F 1/133603 362/97.1 |
| 2020/0135991 A1 | 4/2020 | Lin et al. | |
| 2020/0209685 A1* | 7/2020 | Nakamura | G02F 1/133524 |

FOREIGN PATENT DOCUMENTS

| | | |
|---|---|---|
| CN | 205176441 | 4/2016 |
| CN | 207148489 | 3/2018 |
| TW | I703743 | 9/2020 |

OTHER PUBLICATIONS

Office Action of Taiwan Counterpart Application, dated Mar. 2, 2022, pp. 1-7.

* cited by examiner

*Primary Examiner* — Karabi Guharay
(74) *Attorney, Agent, or Firm* — JCIPRNET

(57) ABSTRACT

A direct-type light source module including N-stage light sources and an optical sheet is provided. The optical sheet is disposed above the N-stage light sources, and an optical distance between the i-th-stage light source and the optical sheet is smaller than an optical distance between the i+1-th-stage light source and the optical sheet, where $1 \leq i < N$, and N is a positive integer greater than 1. A display device is also provided.

16 Claims, 6 Drawing Sheets

DIRECT-TYPE LIGHT SOURCE MODULE AND DISPLAY DEVICE

CROSS-REFERENCE TO RELATED APPLICATION

This application claims the priority benefit of Taiwan application serial no. 110117682, filed on May 17, 2021. The entirety of the above-mentioned patent application is hereby incorporated by reference herein and made a part of this specification.

BACKGROUND

Technical Field

The present application disclosure relates to a light source module and an electronic device, and in particular to a direct-type light source module and a display device.

Description of Related Art

Generally, in a conventional direct-type light source module on the market, multiple light emitting diodes (LEDs) having a same optical distance are arranged evenly on a backplane, and an optical sheet is disposed above these LEDs to provide homogeneous surface light. However, the larger the size of the direct-type light source module, the greater the number of LEDs required, resulting in an increase in the cost and weight of the direct-type light source module.

SUMMARY

The present application disclosure provides a direct-type light source module and a display device, which facilitate reducing the number of light emitting elements required.

According to an embodiment of the present application disclosure, a direct-type light source module includes N-stage light sources and an optical sheet. The optical sheet is disposed above the N-stage light sources, and an optical distance between an i-th-stage light source and the optical sheet is smaller than an optical distance between an i+1-th-stage light source and the optical sheet, where $1 \leq i < N$, and N is a positive integer greater than 1.

According to another embodiment of the present application disclosure, a display device includes a direct-type light source module and a display panel. The direct-type light source module includes N-stage light sources and an optical sheet. The optical sheet is disposed above the N-stage light sources, and an optical distance between an i-th-stage light source and the optical sheet is smaller than an optical distance between an i+1-th-stage light source and the optical sheet, where $1 \leq i < N$, and N is a positive integer greater than 1. The display panel is disposed on the direct-type light source module.

To further describe the above features and advantages of the disclosure, embodiments accompanied with drawings are described below in details.

BRIEF DESCRIPTION OF THE DRAWINGS

The accompanying drawings are included to provide a further understanding of the present application disclosure, and are incorporated in and constitute a part of this specification. The drawings illustrate embodiments of the present application disclosure and, together with the description, serve to explain the principles of the present application disclosure.

DESCRIPTION OF THE EMBODIMENTS

Figure 1:
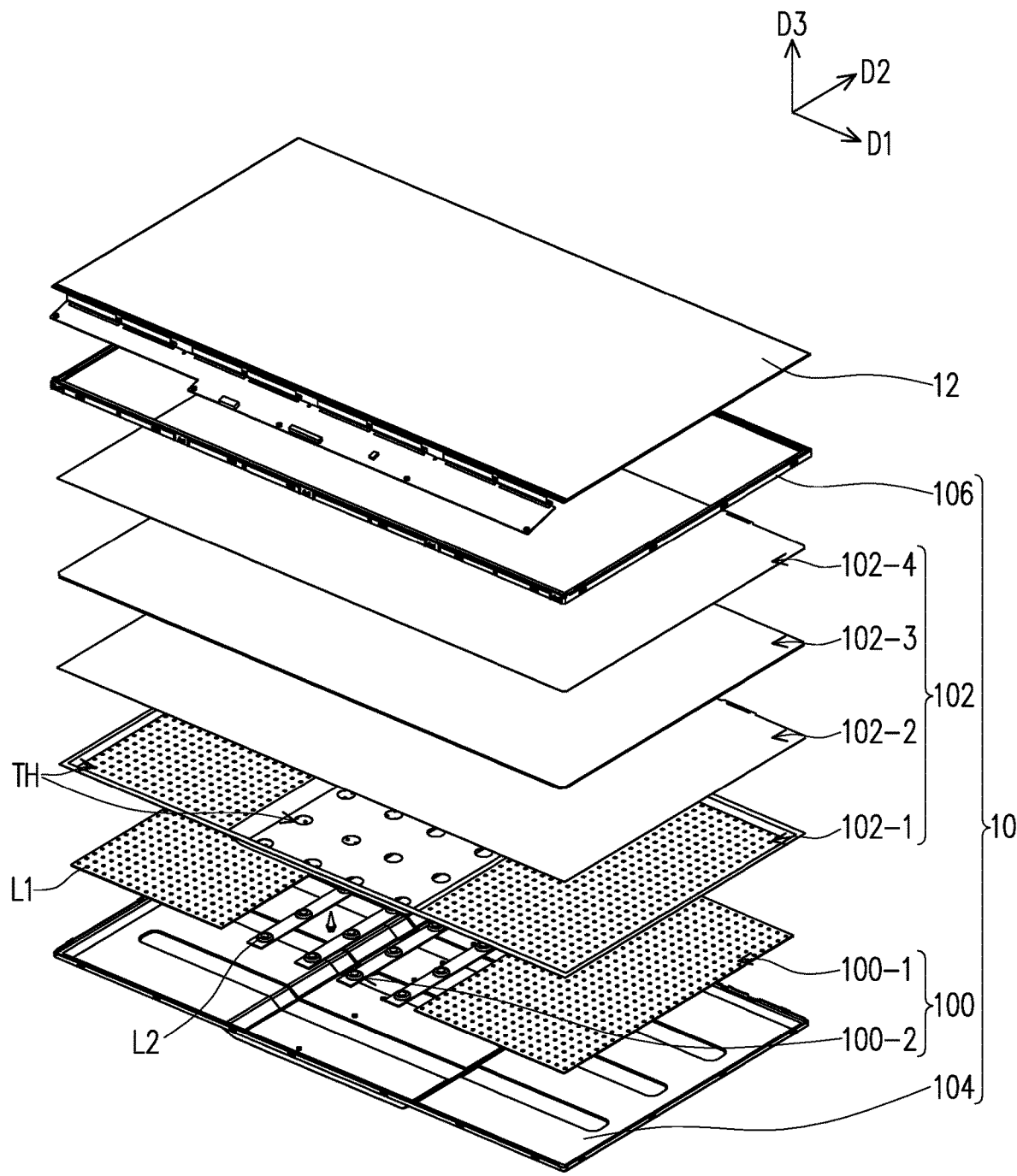
FIGS. 1 and 2 are respectively a schematic exploded view and a schematic cross-sectional view of a display device according to an embodiment of the present application disclosure.

In the drawings, each drawing illustrates the general characteristics of the method, structure, or material used in a specific embodiment. However, these drawings should not be construed as defining or limiting the scope or nature of these embodiments. For example, for the sake of clarity, the relative size, thickness and position of each layer, region or structure may be reduced or increased.

In the following embodiments, same element symbols will refer to same or like elements, and descriptions thereof will not be repeated. In addition, features in different embodiments may be combined as long as the features are not in conflict, and simple equivalent changes and modifications made in accordance with the specification or the claims still fall within the scope of this patent.

The terms "first" and "second" mentioned in this specification or the claims are only used to name different elements or distinguish different embodiments or ranges, and are not used to limit the upper or lower limit of the number of elements, and nor are they used to limit the manufacturing sequence or disposition sequence of the elements. In addition, disposing one element/sheet layer on (or above) another element/sheet layer may cover the following conditions: the element/sheet layer is directly arranged on (or above) the other element/sheet layer, and two element/sheet layers direct contact each other; and the element/sheet layer is indirectly arranged on (or above) the other element/sheet layer, and one or more element/sheet layers exist between the two element/sheet layers.

Figure 2:
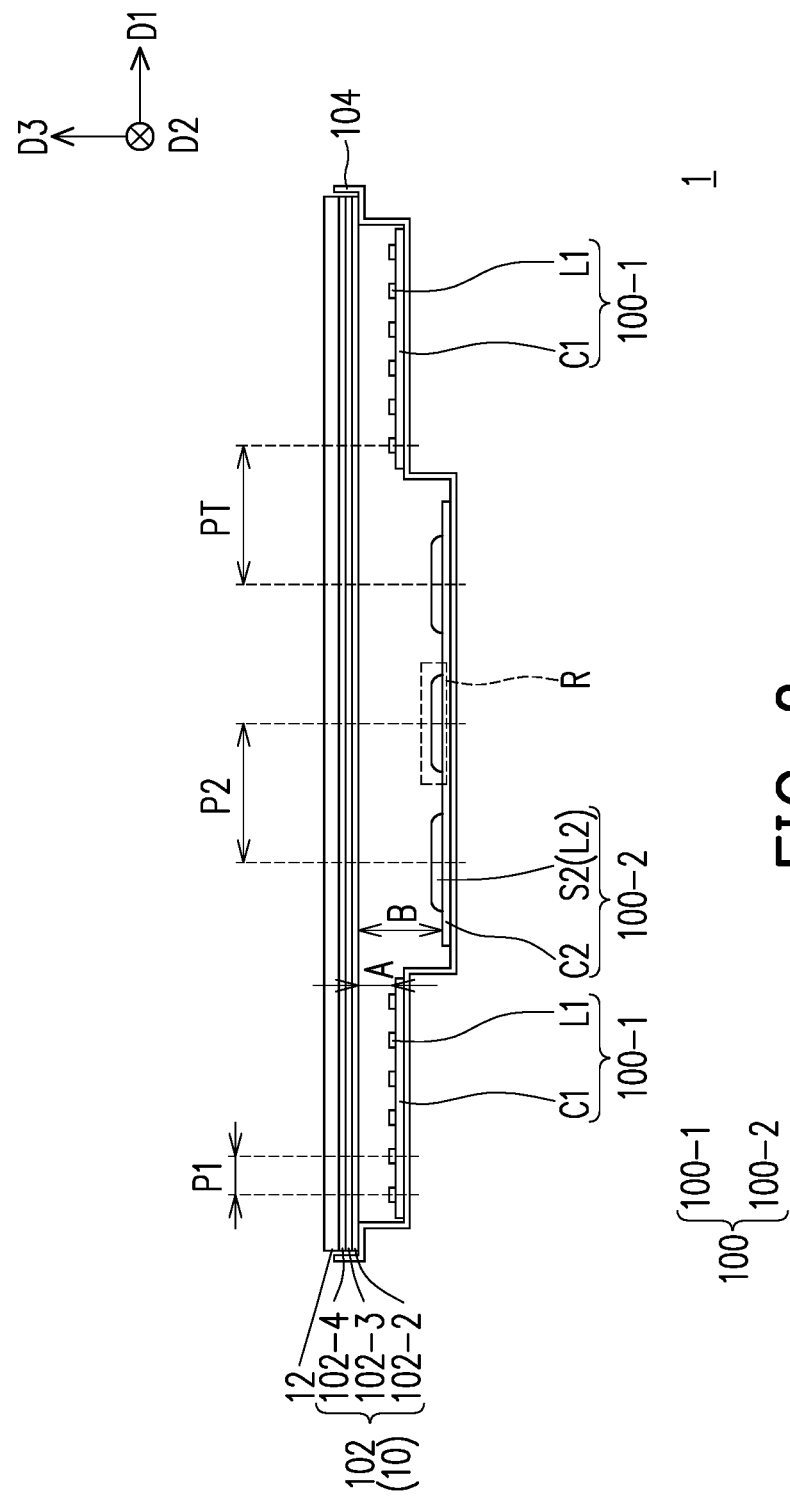
Figure 3:
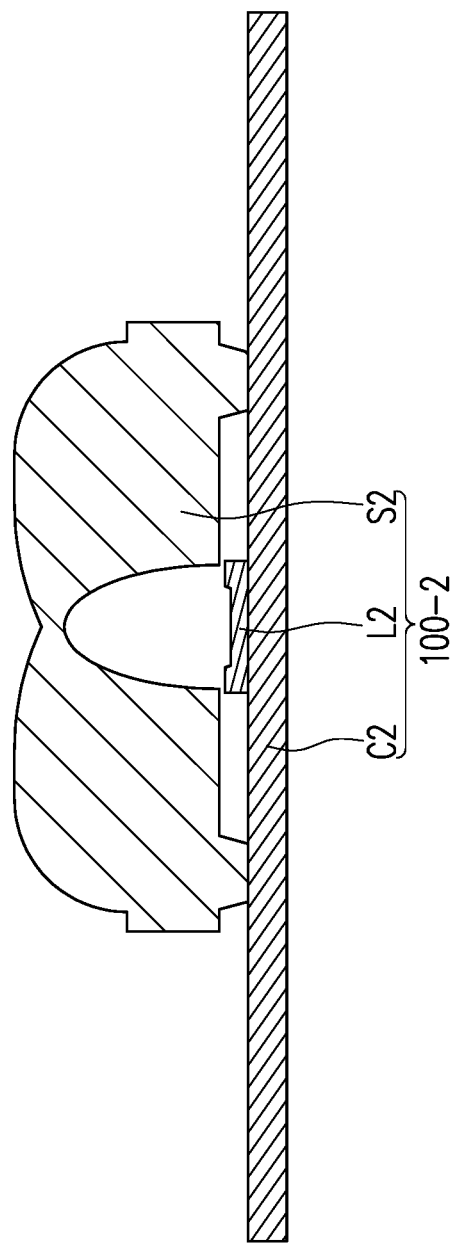
FIG. 3 is a schematic enlarged view of an area R in FIG. 2.

FIGS. 1 and 2 are respectively a schematic exploded view and a schematic cross-sectional view of a display device according to an embodiment of the present application disclosure. FIG. 3 is a schematic enlarged view of an area R in FIG. 2.

Referring to FIGS. 1 to 3, a display device 1 includes a direct-type light source module 10 and a display panel 12, but the present application disclosure is not limited thereto. In the display device 1, one or more elements or layers may be added or removed according to needs.

The direct-type light source module 10 may be used to provide an illumination beam to the display panel 12. The display panel 12 is disposed on the direct-type light source module 10 and may be used to convert the illumination beam into a display beam with display information (such as grayscale and/or color). For example, the display panel 12 may include a non-self-luminous display panel, such as a liquid crystal display panel, but the present application disclosure is not limited thereto.

The direct-type light source module 10 may include N-stage light sources 100 and an optical sheet 102, but the present application disclosure is not limited thereto. One or more elements or layers may be added or removed in the direct-type light source module 10 according to needs. For example, the direct-type light source module 10 may further include a backplane 104 and a middle frame 106, but the present application disclosure is not limited thereto.

N in the N-stage light sources 100 is a positive integer greater than 1. The N-stage light sources 100 satisfy: the optical distance between the i-th-stage light source and the optical sheet 102 is smaller than the optical distance between the i+1-th-stage light source and the optical sheet 102, and $1 \leq i < N$. In other words, the N-stage light sources 100 may have N optical distances, and the N optical distances are different from each other (the larger the i, the larger the optical distance). The optical distance between the i-th-stage light source and the optical sheet 102 may be defined as the shortest distance between the circuit board in the i-th-stage light source and the optical sheet 102 in the thickness direction (such as a third direction D3) of the direct-type light source module 10. When the optical sheet 102 includes a plurality of sheets, the optical distance between the i-th-stage light source and the optical sheet 102 may be defined as the shortest distance between the circuit board in the i-th-stage light source and the sheet (that is, the sheet at the bottom) in the optical sheet 102 that is closest to the i-th-stage light source in the thickness direction (such as the third direction D3) of the direct-type light source module 10.

In this embodiment, as shown in FIGS. 1 and 2, N is, for example, 2; that is, the N-stage light sources 100 are 2-stage light sources, and the N-stage light sources 100 include a 1st-stage light source 100-1 and a 2nd-stage light source 100-2. An optical distance A between the 1st-stage light source 100-1 and the optical sheet 102 is smaller than an optical distance B between the 2nd-stage light source 100-2 and the optical sheet 102.

Specifically, the first-stage light source 100-1 may include a first circuit board C1 and a plurality of first light emitting elements L1. The first circuit board C1 may include a printed circuit board, but the present application disclosure is not limited thereto.

The first light emitting elements L1 are arranged on the first circuit board C1 and may be arranged in an array along a first direction D1 and a second direction D2. The first direction D1 and the second direction D2 intersect each other and are both vertical to the thickness direction (such as the third direction D3) of the direct-type light source module 10. In some embodiments, the first direction D1 and the second direction D2 may be vertical to each other, but the present application disclosure is not limited thereto. For ease of illustration, the number of first light emitting elements L1 in FIG. 2 is smaller than the number of first light emitting elements L1 in FIG. 1, but it should be understood that the quantity of the first light emitting elements L1 arranged in the first direction D1 in FIGS. 1 and 2 is the same. FIG. 1 schematically illustrates that the first light emitting elements L1 are disposed on opposite sides of the 2nd-stage light source 100-2 in the first direction D1, but the present application disclosure is not limited thereto. In other embodiments that are not shown, the first light emitting elements L1 may be disposed on opposite sides of the 2nd-stage light source 100-2 in the second direction D2, or the first light emitting elements L1 may be disposed on three sides or around the 2nd-stage light source 100-2. The first light emitting elements L1 may include a plurality of sub-millimeter light emitting diodes (mini LEDs), and the first light emitting elements L1 may have the same optical distance A. The optical distance A may be defined as the shortest distance between the first circuit board C1 and the optical sheet 102 (for example, a diffuser plate 102-2) in the thickness direction (such as the third direction D3) of the direct-type light source module 10.

The 2nd-stage light source 100-2 may include a second circuit board C2, a plurality of second light emitting elements L2, and a plurality of secondary optical elements S2. The second circuit board C2 may include a printed circuit board, but the present application disclosure is not limited thereto.

The second light emitting elements L2 are arranged on the second circuit board C2 and may be arranged in an array along the first direction D1 and the second direction D2. For ease of illustration, the number of second light emitting elements L2 in FIG. 2 is smaller than the number of second light emitting elements L2 in FIG. 1, but it should be understood that the quantity of the second light emitting elements L2 arranged in the first direction D1 in FIGS. 1 and 2 is the same. The second light emitting elements L2 may include a plurality of light emitting diodes (LEDs), and the second light emitting elements L2 may have the same optical distance B. The optical distance B may be defined as the shortest distance between the second circuit board C2 and the optical sheet 102 (such as the diffuser plate 102-2) in the thickness direction (such as the third direction D3) of the direct-type light source module 10, but the present application disclosure is not limited thereto.

The secondary optical elements S2 are disposed on the second circuit board C2, and the second light emitting elements L2 are located between the of secondary optical elements S2 and the second circuit board C2. The secondary optical elements S2 may include a plurality of secondary lenses, and each of the secondary optical elements S2 may be disposed above one or more second light emitting elements L2 to change the light shape of the one or more second light emitting elements L2, for example, increasing the light emitting angle, but the present application disclosure is not limited thereto.

In the 2nd-stage light source 100-2, the mini LED is replaced with the LED as the second light emitting element L2, so a pitch P2 of the second light emitting elements L2 in the 2nd-stage light source 100-2 may be greater than a pitch P1 of the first light emitting elements L1 in the 1st-stage light source 100-1, thereby reducing the number of light emitting elements (such as the total number of mini LEDs and LEDs) and reducing the cost and/or weight of the direct-type light source module 10 and the display device 1. In addition, through the design of the secondary optical element along with the LED, the light emitting angle of the LED may be increased, so the pitch P2 may be further increased, thereby further reducing the number of light emitting elements required and reducing the cost and/or weight of the direct-type light source module 10 and the display device 1.

Taking a 27-inch display device as an example, the optical distance A and the optical distance B of the 2-stage light sources may respectively be 5 mm and 15 mm, the pitch P1 and the pitch P2 may respectively be 10 mm and 52 mm, and the total number of mini LEDs and LEDs is roughly 1062. On the other hand, a direct-type light source module with only mini LEDs as light emitting elements requires roughly 2040 mini LEDs, which is 978 more than what is required in the direct-type light source module 10 with LEDs and mini LEDs as light emitting elements.

In addition, in the direct-type light source module 10 and the display device 1, N optical distances (including the optical distance A and the optical distance B) between the N-stage light sources 100 and the optical sheet 102 may all fall within the range of 5 mm to 30 mm, that is, 5 mm≤A(or B)≤30 mm. Therefore, the direct-type light source module 10 and the display device 1 may provide a slim visual effect or have a slim appearance.

It should be understood that although FIGS. 1 and 2 schematically illustrate that the N-stage light sources 100 are 2-stage light sources, and N may be increased according to needs. For example, N may increase as the size of display device 1 increases. In some embodiment, N falls in the range of 2 to 5 (that is, 2≤N≤5), thereby reducing the number of light emitting elements, reducing the cost and/or weight of the direct-type light source module 10 and the display device 1, or providing a slim visual effect. In addition, the larger the size of the direct-type light source module 10 or the display device 1, the fewer the light emitting elements are required to be used.

The combination of a plurality of LEDs and a plurality of secondary optical elements facilitates reducing the number of light emitting elements required and reducing the cost and/or weight of the direct-type light source module 10 and the display device 1. On the other hand, adopting a plurality of mini LEDs facilitates reducing the driving current and realizing the design of local diming. In an embodiment where N falls in the range of 2 to 5, a light source (such as the 2nd-stage light source 100-2) in the N-stage light sources with an optical distance (such as the optical distance B) greater than or equal to 15 mm may include or adopt a plurality of LEDs and a plurality of secondary optical elements, and a light source (such as the 1st-stage light source 100-1) in the N-stage light sources with an optical distance (such as the optical distance A) smaller than 15 mm may include or adopt a plurality of mini LEDs.

Under an architecture of a plurality of optical distances, the optical distance A, for example, falls within the range of 5 mm to 13 mm (that is, 5 mm≤A≤13 mm), and the optical distance B, for example, falls within the range of 15 mm to 30 mm (that is, 15 mm≤B≤30 mm). Taking the imaging performance into account, the direct-type light source module 10 may satisfy: a pitch PT between the first light emitting element L1 in the 1st-stage light source 100-1 which is adjacent to the 2nd-stage light source 100-2 and the second light emitting element L2 in the 2nd-stage light source 100-2 which is adjacent to the 1st-stage light source 100-1 falls between S1 and S2, and S1=−1.6A+2B and S2=A+0.47B. S1 and S2 respectively are the boundary values of the pitch PT. When the pitch PT falls within the range of S1 and S2, the image located between the 1st-stage light source 100-1 and the 2nd-stage light source 100-2 appears homogeneous, and no obvious dark zones may be seen under a 2% neutral density filter.

Table 1 shows 10 sets of examples. Taking Example 10 as an example, when A=5 mm and B=15 mm, the pitch PT may fall within the range of 12 mm (rounded to the nearest whole number) to 22 mm (that is, 12 mm≤PT≤22 mm). In this way, the images located between the 1st-stage light source 100-1 and the 2nd-stage light source 100-2 all appear homogeneous. The rest of the examples may be deduced by analogy and will not be repeated herein.

TABLE 1

| Example | Optical distance A (mm) | Optical distance B (mm) | S1 (mm) | S2 (mm) |
| --- | --- | --- | --- | --- |
| 1 | 5 | 17 | 26 | 12.99 |
| 2 | 5 | 19 | 30 | 13.93 |
| 3 | 5 | 21 | 34 | 14.87 |
| 4 | 5 | 23 | 38 | 15.81 |
| 5 | 5 | 25 | 42 | 16.75 |
| 6 | 13 | 15 | 9.2 | 20.05 |
| 7 | 11 | 15 | 12.4 | 18.05 |
| 8 | 9 | 15 | 15.6 | 16.05 |
| 9 | 7 | 15 | 18.8 | 14.05 |
| 10 | 5 | 15 | 22 | 12.05 |

Referring to FIGS. 1 and 2, the optical sheet 102 is disposed above the N-stage light sources 100. Taking FIGS. 1 and 2 as an example, the optical sheet 102 may include a reflector sheet 102-1 (not shown in FIG. 2, referring to FIG. 1), a diffuser plate 102-2, a color conversion sheet 102-3, and a prism sheet 102-4 stacked in sequence along the third direction D3, but the present application disclosure is not limited thereto. One or more sheets may be added or removed in the optical sheet 102 according to needs.

The reflector sheet 102-1 may be used to reflect a beam passing towards below the direct-type light source module 10, so that the beam is turned and passes towards the display panel 12. For example, the reflector sheet 102-1 may be a metal sheet or a white reflector sheet, but the present application disclosure is not limited thereto. The reflector sheet 102-1 may have a plurality of through vias TH. The through vias TH respectively expose a plurality of light emitting elements in the N-stage light sources 100, such as the first light emitting elements L1 and the second light emitting elements L2.

The diffuser plate 102-2 may be used to homogenize the beam. For example, the diffuser plate may be a transparent sheet with a rough surface or diffuser particles, but the present application disclosure is not limited thereto.

The color conversion sheet 102-3 may be used to change the color of the beam. For example, the color conversion sheet 102-3 may include a phosphor, a quantum dot, or a combination thereof, but the present application disclosure is not limited thereto. In some embodiments, a plurality of light emitting elements (such as the first light emitting elements L1 and the second light emitting elements L2) in the N-stage light sources 100 may be a plurality of light emitting elements emitting blue light. Correspondingly, the color conversion sheet 102-3 may be a color conversion element that converts blue light into red light and green light to be mixed into white light.

In some embodiments not illustrated, the optical sheet 102 may further include a blue light penetrating sheet. The blue light penetrating sheet may allow blue light to penetrate and reflect red and green light, and the blue light penetrating sheet may be disposed between the diffuser plate 102-2 and the color conversion sheet 102-3 to reduce color shift. Specifically, after the blue light passes through the color conversion sheet 102-3, the red and green light excited by the blue light scatter in all directions, and part of the red light and green light returns to an optical cavity (that is, the accommodating space between the optical sheet 102 and the backplane 104) and then is reflected by the reflector sheet 102-1. Under different optical distances, the distance traveled by the red light and the green light in the optical cavity is different, which leads to color shift. By disposing the blue light penetrating sheet between the diffuser plate 102-2 and the color conversion sheet 102-3, the red and green light passing towards the optical cavity may be reflected, thereby reducing optical loss of the red and green light and reducing the probability of the red and green light entering the optical cavity, thereby reducing color shift.

The following Table 1 and Table 2 are used to verify the fact that disposing the blue light penetrating sheet reduces color shift. In Table 1 and Table 2, the experimental light sources are all LEDs with a secondary optical lens, and the pitch of the LEDs is 15 mm. In Table 1 and Table 2, OD5, OD10, and OD15 respectively indicate that the optical distance is 5 mm, 10 mm, and 15 mm. The x and y values are color coordinate values.

TABLE 1

| Blue light penetrating sheet not disposed | | |
|---|---|---|
| | x | y |
| OD5 | 0.2816 | 0.3084 |
| OD10 | 0.2673 | 0.2882 |
| OD15 | 0.2601 | 0.2776 |

TABLE 2

| Blue light penetrating sheet disposed | | |
|---|---|---|
| | x | y |
| OD5 | 0.3045 | 0.3413 |
| OD10 | 0.3043 | 0.3424 |
| OD15 | 0.3043 | 0.3433 |

According to Table 1 and Table 2, under different optical distances, if the blue light penetrating sheet is not disposed, the maximum difference in color coordinates of white light is: $\Delta x=0.0215$ and $\Delta y=0.0308$. On the other hand, under different optical distances, if the blue light penetrating sheet is disposed, the maximum difference in the color coordinates of the white light is: $\Delta x=0.0002$ and $\Delta y=0.002$. It can be seen that disposing a blue light penetrating sheet between the diffuser plate 102-2 and the color conversion sheet 102-3 may reduce color shift.

In other embodiments, a plurality of light emitting elements (such as the first light emitting elements L1 and the second light emitting elements L2) in the N-stage light sources 100 may be a plurality of light emitting elements that emit white light, such as LED chips encapsulated with a color conversion layer thereon, or mini LED chips encapsulated with a color conversion layer thereon. In this way, the color conversion sheet 102-3 may be omitted.

The prism sheet 102-4 may be used to provide the effect of focusing and brightening the beam. For example, the prism sheet 102-4 may include a plurality of prisms extending along the first direction D1 or the second direction D2, but the present application disclosure is not limited thereto.

The backplane 104 is disposed at the bottom of the direct-type light source module 10 and may be used to provide support or load bearing. In some embodiments, the material of the backplane 104 may include metal, alloy or a combination thereof to further provide the effect of heat-dissipation.

The middle frame 106 (not shown in FIG. 2, referring to FIG. 1) may be used to support the display panel 12 and fix or press the optical sheet 102 thereunder.

Figure 4:
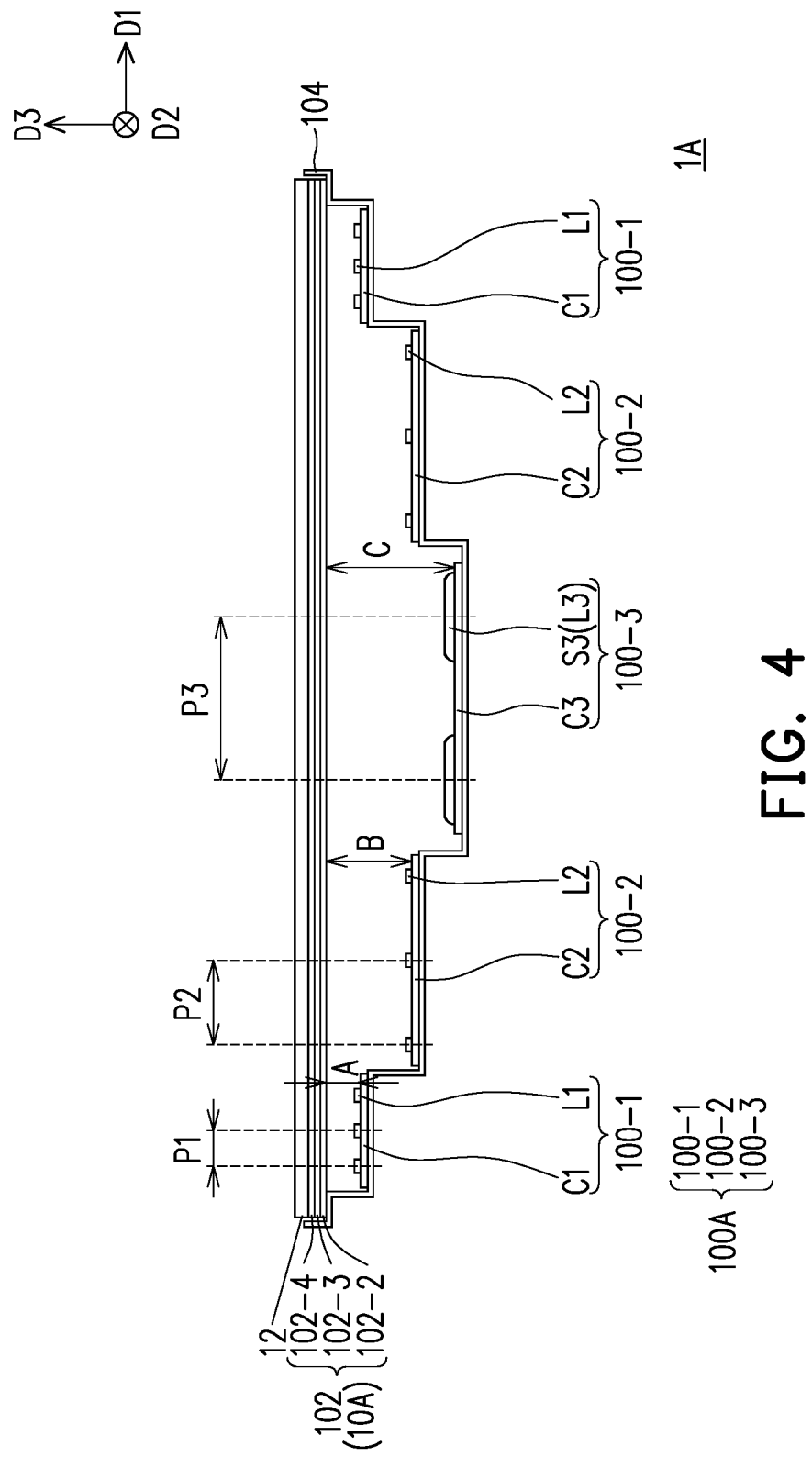
FIGS. 4 to 6 are respectively a schematic cross-sectional view of a display device according to other embodiments of the present application disclosure.
Figure 5:
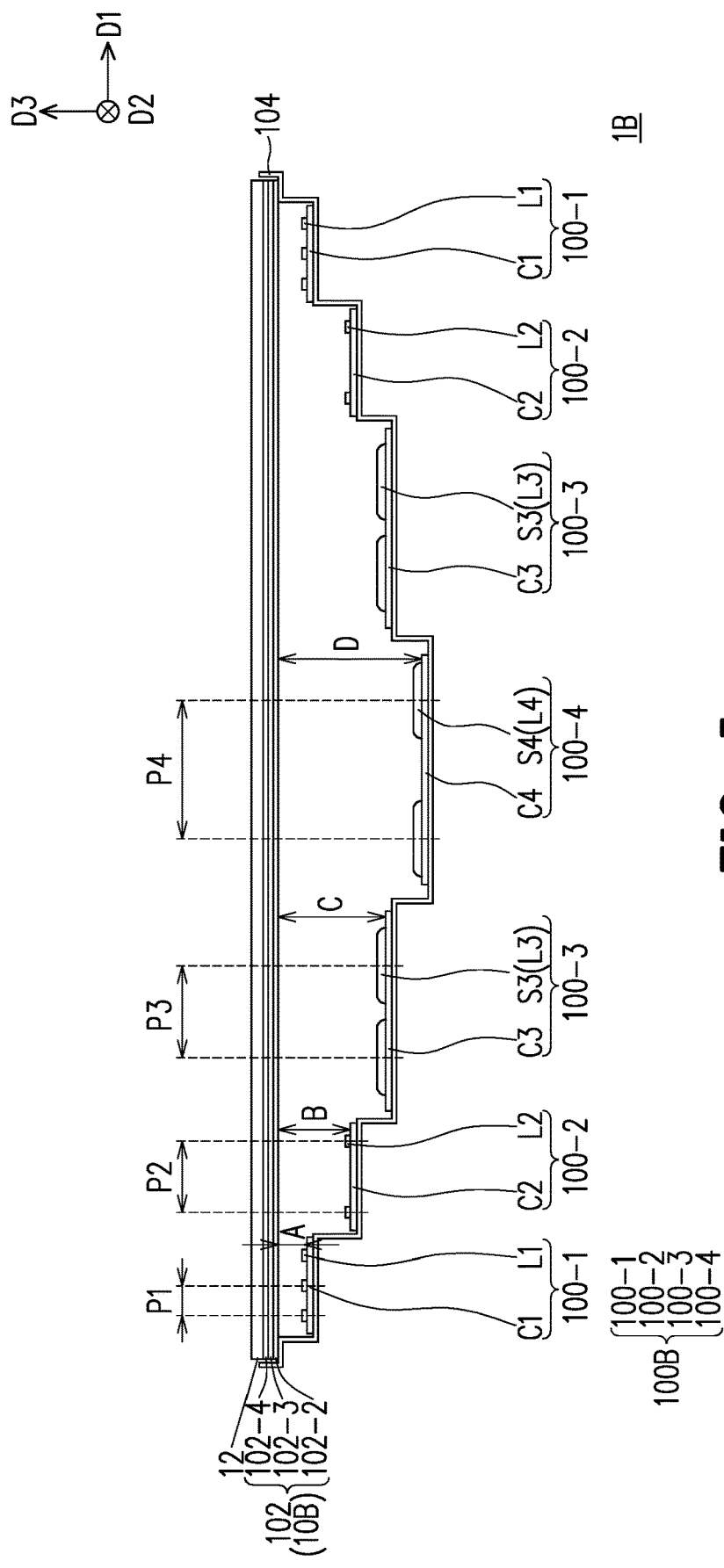
Figure 6:
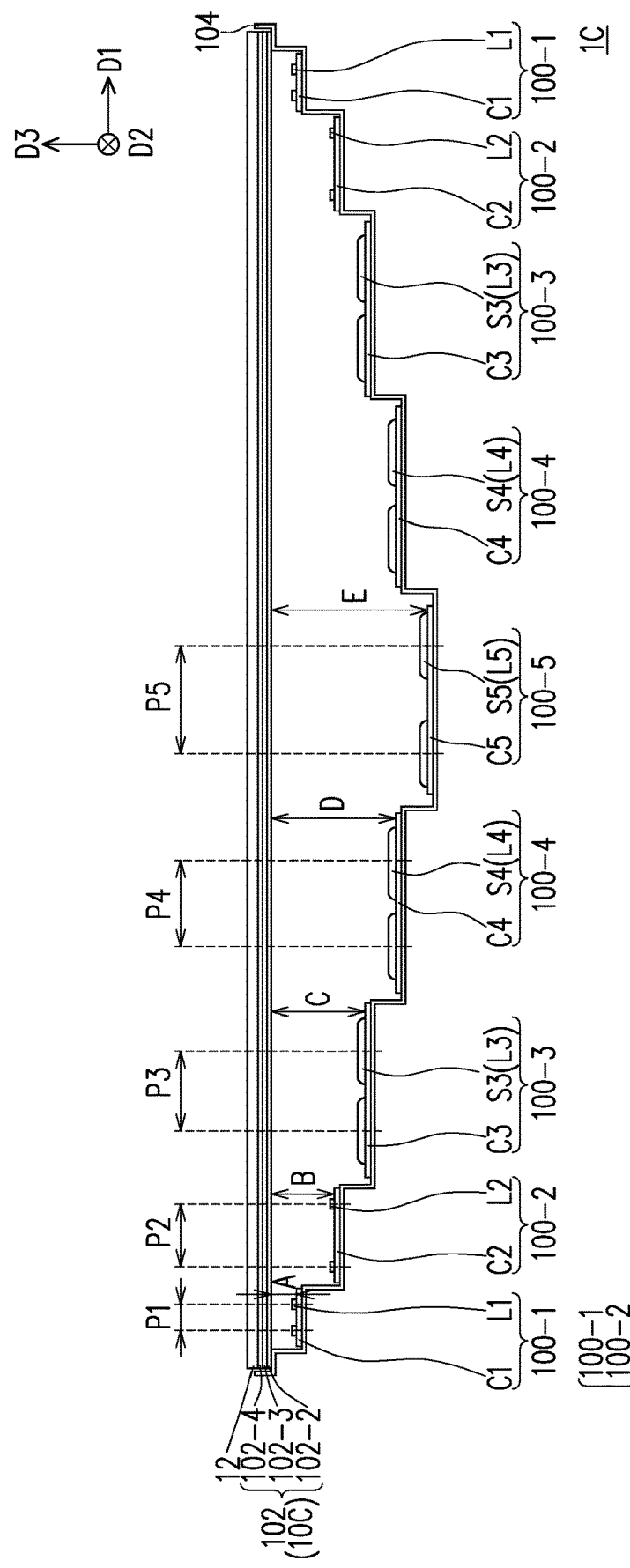

FIGS. 4 to 6 are respectively a schematic cross-sectional view of a display device according to other embodiments of the present application disclosure. To simplify the drawings, some elements are omitted from FIGS. 4 to 6, such as the reflector sheet 102-1 and the middle frame 106 in FIG. 1. In the embodiments of FIGS. 4 to 6, though not shown, the optical sheet 102 may further include a blue light penetrating sheet disposed between the diffuser plate 102-2 and the color conversion sheet 102-3 to reduce color shift.

Referring to FIG. 4, the main differences between a display device 1A and the display device 1 in FIG. 2 are described as follows. In the display device 1A, N-stage light sources 100A of a direct-type light source module 10A are 3-stage light sources, and the N-stage light sources 100A include the 1st-stage light source 100-1, the 2nd-stage light source 100-2, and a 3rd-stage light source 100-3. The optical distance A between the 1st-stage light source 100-1 and the optical sheet 102 (such as the diffuser plate 102-2) is smaller than the mixing distance B between the 2nd-stage light source 100-2 and the optical sheet 102 (such as the diffuser plate 102-2), and the optical distance B between the 2nd-stage light source 100-2 and the optical sheet 102 is smaller than an optical distance C between the 3rd-stage light source 100-3 and the optical sheet 102 (such as the diffuser plate 102-2).

In addition, the 1st-stage light source 100-1 may include the first circuit board C1 and the plurality of first light emitting elements L1. The 2nd-stage light source 100-2 may include the second circuit board C2 and the plurality of second light emitting elements L2. The 3rd-stage light source 100-3 may include a third circuit board C3, a plurality of third light emitting elements L3, and a plurality of secondary optical elements S3. FIG. 3 may be referred to for the relative disposition relationship between the elements in the 3rd-stage light source 100-3, and details thereof will not be repeated herein. The first light emitting elements L1 and the second light emitting elements L2 may include a plurality of mini LEDs, and the third light emitting elements L3 may include a plurality of LEDs.

In addition, the pitch P2 of the second light emitting elements L2 in the 2nd-stage light source 100-2 is greater than the pitch P1 of the first light emitting elements L1 in the 1st-stage light source 100-1, and a pitch P3 of the third light emitting elements L3 in the 3rd-stage light source 100-3 is greater than the pitch P2 of the second light emitting elements L2 in the 2nd-stage light source 100-2.

Taking a 50-inch display device as an example, the optical distance A, the optical distance B, and the optical distance C of the 3-stage light sources may respectively be 5 mm, 12 mm, and 20 mm, the pitch P1, the pitch P2, and the pitch P3 may respectively be 10 mm, 24 mm, and 76 mm, and the total number of mini LEDs and LEDs is roughly 3176. On the other hand, a direct-type light source module with only mini LEDs as light emitting elements requires roughly 6882 mini LEDs, which is 3706 more than what is required in the direct-type light source module 10A with LEDs and mini LEDs as light emitting elements.

Referring to FIG. 5, the main differences between a display device 1B and the display device 1 in FIG. 2 are described as follows. In the display device 1B, N-stage light sources 100B of a direct-type light source module 10B are 4-stage light sources, and the N-stage light sources 100B include the 1st-stage light source 100-1, the 2nd-stage light source 100-2, the 3rd-stage light source 100-3, and a 4th-stage light source 100-4. The optical distance A between the 1st-stage light source 100-1 and the optical sheet 102 (such as the diffuser plate 102-2) is smaller than the optical distance B between the 2nd-stage light source 100-2 and the optical sheet 102 (such as the diffuser plate 102-2). The optical distance B between the 2nd-stage light source 100-2 and the optical sheet 102 is smaller than the optical distance C between the 3rd-stage light source 100-3 and the optical sheet 102 (such as diffuser plate 102-2). The optical distance C between the 3rd-stage light source 100-3 and the optical sheet 102 is smaller than an optical distance D between the 4th-stage light source 100-4 and the optical sheet 102 (such as the diffuser plate 102-2).

In addition, the 1st-stage light source 100-1 may include the first circuit board C1 and the plurality of first light emitting elements L1. The 2nd-stage light source 100-2 may include the second circuit board C2 and the plurality of second light emitting elements L2. The 3rd-stage light source 100-3 may include the third circuit board C3, the plurality of third light emitting elements L3, and the plurality of secondary optical elements S3. The 4th-stage light source 100-4 may include a fourth circuit board C4, a plurality of fourth light emitting elements L4, and a plurality of secondary optical elements S4. FIG. 3 may be referred to for the relative disposition relationship between the elements in the 3rd-stage light source 100-3 and the 4th-stage light source 100-4, and details thereof will not be repeated herein. The first light emitting elements L1 and the second light emitting elements L2 may include a plurality of mini LEDs, and the third light emitting elements L3 and the fourth light emitting elements L4 may include a plurality of LEDs.

In addition, the pitch P2 of the second light emitting elements L2 in the 2nd-stage light source 100-2 is greater than the pitch P1 of the first light emitting elements L1 in the 1st-stage light source 100-1. The pitch P3 of the third light emitting elements L3 in the 3rd-stage light source 100-3 is greater than the pitch P2 of the second light emitting elements L2 in the 2nd-stage light source 100-2. A pitch P4 of the fourth light emitting elements L4 in the 4th-stage light source 100-4 is greater than the pitch P3 of the third light emitting elements L3 in the 3rd-stage light source 100-3.

Taking a 75-inch display device as an example, the optical distance A, the optical distance B, the optical distance C, and the optical distance D of the 4-stage light sources may respectively be 5 mm, 12 mm, 18 mm, and 25 mm, the pitch P1, the pitch P2, the pitch P3, and the pitch P4 may respectively be 10 mm, 24 mm, 73 mm, and 90 mm, and the total number of mini LEDs and LEDs is roughly 4783. On the other hand, a direct-type light source module with only mini LEDs as light emitting elements requires roughly 15,604 mini LEDs, which is 10,821 more than what is required in the direct-type light source module 10B with LEDs and mini LEDs as light emitting elements.

Referring to FIG. 6, the main differences between a display device 1C and the display device 1 of FIG. 2 are described as follows. In the display device 1C, N-stage light sources 100C of a direct-type light source module 10C are 5-stage light sources, and the N-stage light sources 100C include the 1st-stage light source 100-1, the 2nd-stage light source 100-2, the 3rd-stage light source 100-3, the 4th-stage light source 100-4, and a 5th-stage light source 100-5. The optical distance A between the 1st-stage light source 100-1 and the optical sheet 102 (such as the diffuser plate 102-2) is smaller than the optical distance B between the 2nd-stage light source 100-2 and the optical sheet 102 (such as the diffuser plate 102-2). The optical distance B between the 2nd-stage light source 100-2 and the optical sheet 102 is smaller than the optical distance C between the 3rd-stage light source 100-3 and the optical sheet 102 (such as the diffuser plate 102-2). The optical distance C between the 3rd-stage light source 100-3 and the optical sheet 102 is smaller than the optical distance D between the 4th-stage light source 100-4 and the optical sheet 102 (such as the diffuser plate 102-2). The optical distance D between the 4th-stage light source 100-4 and the optical sheet 102 is smaller than an optical distance E between the 5th-stage light source 100-5 and the optical sheet 102 (such as the diffuser plate 102-2).

In addition, the 1st-stage light source 100-1 may include the first circuit board C1 and the plurality of first light emitting elements L1. The 2nd-stage light source 100-2 may include the second circuit board C2 and the plurality of second light emitting elements L2. The 3rd-stage light source 100-3 may include the third circuit board C3, the plurality of third light emitting elements L3, and the plurality of secondary optical elements S3. The 4th-stage light source 100-4 may include the fourth circuit board C4, the plurality of fourth light emitting elements L4, and the plurality of secondary optical elements S4. The 5th-stage light source 100-5 may include a fifth circuit board C5, a plurality of fifth light emitting elements L5, and a plurality of secondary optical elements S5. FIG. 3 may be referred to for the relative disposition relationship between the elements in the 3rd-stage light source 100-3, the 4th-stage light source 100-4, and the 5th-stage light source 100-5, and details thereof will not be repeated herein. The first light emitting elements L1 and the second light emitting elements L2 may include a plurality of mini LEDs, and the third light emitting elements L3, the fourth light emitting elements L4, and the fifth light emitting elements L5 may include a plurality of LEDs.

In addition, the pitch P2 of the second light emitting elements L2 in the 2nd-stage light source 100-2 is greater than the pitch P1 of the first light emitting elements L1 in the 1st-stage light source 100-1. The pitch P3 of the third light emitting elements L3 in the 3rd-stage light source 100-3 is greater than the pitch P2 of the second light emitting elements L2 in the 2nd-stage light source 100-2. The pitch P4 of the fourth light emitting elements L4 in the 4th-stage light source 100-4 is greater than the pitch P3 of the third light emitting elements L3 in the 3rd-stage light source 100-3. A pitch P5 of the fifth light emitting elements L5 in the 5th-stage light source 100-5 is greater than the pitch P4 of the fourth light emitting elements L4 in the 4th-stage light source 100-4.

Taking a 75-inch display device as an example, the optical distance A, the optical distance B, the optical distance C, the optical distance D, and the optical distance E of the 5-stage light sources may respectively be 5 mm, 12 mm, 18 mm, 24 mm, and 30 mm, the pitch P1, the pitch P2, the pitch P3, the pitch P4, and the pitch P5 may respectively be 10 mm, 24 mm, 73 mm, 86 mm, and 100 mm, and the total number of mini LEDs and LEDs is roughly 3891. On the other hand, a direct-type light source module with only mini LEDs as light emitting elements requires roughly 15,604 mini LEDs, which is 11,713 more than what is required in the direct-type light source module 10C with LEDs and mini LEDs as light emitting elements.

In summary, in the embodiments of the present application disclosure, through the design of different optical distances, the number of light emitting elements may be reduced, the cost and/or weight of direct-type light source modules and display devices may be reduced, or a slim visual effect may be provided. In addition, the larger the size of the direct-type light source module or display device, the fewer the light emitting elements are required to be used.

Although the disclosure has been disclosed in the above by way of embodiments, the embodiments are not intended to limit the disclosure. Those with ordinary knowledge in the technical field can make various changes and modifications without departing from the spirit and scope of the disclosure.

Therefore, the scope of protection of the disclosure is defined by the scope of the appended claims.

What is claimed is:

1. A direct-type light source module, comprising:
   N-stage light sources; and
   an optical sheet, disposed above the N-stage light sources, wherein an optical distance between an i-th-stage light source and the optical sheet is smaller than an optical distance between an i+1-th-stage light source and the optical sheet, wherein 1≤i<N, and N is a positive integer greater than 1,
   wherein a light source with an optical distance greater than or equal to 15 mm in the N-stage light sources comprises a plurality of light emitting diodes and a plurality of secondary optical elements, and a light source with an optical distance smaller than 15 mm in the N-stage light sources comprises a plurality of sub-millimeter light emitting diodes.

2. The direct-type light source module according to claim 1, wherein N optical distances between the N-stage light sources and the optical sheet all fall within a range of 5 mm to 30 mm.

3. The direct-type light source module according to claim 1, wherein a pitch of a plurality of light emitting elements in the i+1-th-stage light source is greater than a pitch of a plurality of light emitting elements in the i-th-stage light source.

4. The direct-type light source module according to claim 1, wherein N falls within a range of 2 to 5.

5. The direct-type light source module according to claim 1, wherein the direct-type light source module comprises:
   a 1st-stage light source, comprising:
      a first circuit board; and
      a plurality of first light emitting elements, disposed on the first circuit board; and
   a 2nd-stage light source, comprising:
      a second circuit board;
      a plurality of second light emitting elements, disposed on the second circuit board; and
      a plurality of secondary optical elements, disposed on the second circuit board, wherein the plurality of second light emitting elements are located between the plurality of secondary optical elements and the second circuit board.

6. The direct-type light source module according to claim 5, wherein the plurality of first light emitting elements comprise a plurality of sub-millimeter light emitting diodes, and the plurality of second light emitting elements comprise a plurality of light emitting diodes.

7. The direct-type light source module according to claim 5, wherein an optical distance between the 1st-stage light source and the optical sheet is A, an optical distance between the 2nd-stage light source and the optical sheet is B, A falls within a range of 5 mm to 13 mm, and B falls within a range of 15 mm to 30 mm.

8. The direct-type light source module according to claim 7, wherein a pitch between a first light emitting element in the 1st-stage light source which is adjacent to the 2nd-stage light source and a second light emitting element in the 2nd-stage light source which is adjacent to the 1st-stage light source falls between S1 to S2, wherein S1=−1.6A+2B, and S2=A+0.47B.

9. A display device, comprising:
   a direct-type light source module, comprising:
      N-stage light sources; and
      an optical sheet, disposed above the N-stage light sources, wherein an optical distance between an i-th-stage light source and the optical sheet is smaller than an optical distance between an i+1-th-stage light source and the optical sheet, wherein 1≤i<N, and N is a positive integer greater than 1; and
   a display panel, disposed on the direct-type light source module,
   wherein a light source with an optical distance greater than or equal to 15 mm in the N-stage light sources comprises a plurality of light emitting diodes and a plurality of secondary optical elements, and a light source with an optical distance smaller than 15 mm in the N-stage light sources comprises a plurality of sub-millimeter light emitting diodes.

10. The display device according to claim 9, wherein N optical distances between the N-stage light sources and the optical sheet all fall within a range of 5 mm to 30 mm.

11. The display device according to claim 9, wherein a pitch of a plurality of light emitting elements in the i+1-th-stage light source is greater than a pitch of a plurality of light emitting elements in the i-th-stage light source.

12. The display device according to claim 9, wherein N falls within a range of 2 to 5.

13. The display device according to claim 9, wherein the direct-type light source module comprises:
   a 1st-stage light source, comprising:
      a first circuit board; and
      a plurality of first light emitting elements, disposed on the first circuit board; and
   a 2nd-stage light source, comprising:
      a second circuit board;
      a plurality of second light emitting elements, disposed on the second circuit board; and
      a plurality of secondary optical elements, disposed on the second circuit board, wherein the plurality of second light emitting elements are located between the plurality of secondary optical elements and the second circuit board.

14. The display device according to claim 13, wherein the plurality of first light emitting elements comprise a plurality of sub-millimeter light emitting diodes, and the plurality of second light emitting elements comprise a plurality of light emitting diodes.

15. The display device according to claim 13, wherein an optical distance between the 1st-stage light source and the optical sheet is A, an optical distance between the 2nd-stage light source and the optical sheet is B, A falls within a range of 5 mm to 13 mm, and B falls within a range of 15 mm to 30 mm.

16. The display device according to claim 15, wherein a pitch between a first light emitting element in the 1st-stage light source which is adjacent to the 2nd-stage light source and a second light emitting element in the 2nd-stage light source which is adjacent to the 1st-stage light source falls between S1 to S2, wherein S1=−1.6A+2B, and S2=A+0.47B.

\* \* \* \* \*